United States Patent
Durand et al.

(10) Patent No.: US 12,107,477 B2
(45) Date of Patent: Oct. 1, 2024

(54) ELECTRIC MACHINE AND MANUFACTURING METHOD

(71) Applicant: L'Air Liquide, Societe Anonyme pour l'Etude et l'Exploitation des Procedes Georges Claude, Paris (FR)

(72) Inventors: Fabien Durand, Sassenage (FR); Loic Brunet Manquat, Sassenage (FR); Guillaume Delautre, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 294 days.

(21) Appl. No.: 17/629,312

(22) PCT Filed: Jun. 23, 2020

(86) PCT No.: PCT/EP2020/067414
§ 371 (c)(1),
(2) Date: Jan. 21, 2022

(87) PCT Pub. No.: WO2021/013451
PCT Pub. Date: Jan. 28, 2021

(65) Prior Publication Data
US 2022/0263379 A1    Aug. 18, 2022

(30) Foreign Application Priority Data
Jul. 22, 2019   (FR) .................................. FR 1908281

(51) Int. Cl.
*H02K 5/20*   (2006.01)
*H02K 9/193*  (2006.01)

(52) U.S. Cl.
CPC ............. *H02K 5/203* (2021.01); *H02K 9/193* (2013.01)

(58) Field of Classification Search
CPC .............................. H02K 5/203; H02K 9/193
See application file for complete search history.

(56) References Cited

U.S. PATENT DOCUMENTS 5,939,808 A * 8/1999 Adames ................. H02K 5/203
                                                              310/58
9,065,312 B2   6/2015 Fernandes Goncalves
(Continued)

FOREIGN PATENT DOCUMENTS

DE   18 13 190   6/1960
EP   1 209 801   5/2002
(Continued)

OTHER PUBLICATIONS

International Search Report and Written Report for PCT/EP2020/067414, mailed Sep. 3, 2020.
(Continued)

*Primary Examiner* — Tulsidas C Patel
*Assistant Examiner* — Mohammed Ahmed Qureshi
(74) *Attorney, Agent, or Firm* — Justin K. Murray

(57) ABSTRACT

Electric machine, in particular an electric motor for driving at least one compressor or circulator, comprising a stator and a rotor that are disposed in a casing, the machine comprising a cooling device disposed around the stator and comprising a circulation circuit for a cooling fluid, characterized in that the cooling device comprises a circulation pipe for the cooling fluid, comprising a portion embedded in a mass of material with high thermal conductivity such as metal or a metal alloy.

13 Claims, 1 Drawing Sheet

(56) References Cited

U.S. PATENT DOCUMENTS

| | | | | |
|---|---|---|---|---|
| 2003/0062780 A1* | 4/2003 | Kaneko | ................... | H02K 3/24 |
| | | | | 310/58 |
| 2004/0124720 A1* | 7/2004 | Condamin | ............... | H02K 5/24 |
| | | | | 310/51 |
| 2006/0140791 A1* | 6/2006 | Deming | .............. | F04C 18/3564 |
| | | | | 417/410.3 |
| 2012/0263602 A1* | 10/2012 | Booth | ..................... | F03D 80/50 |
| | | | | 416/244 R |

FOREIGN PATENT DOCUMENTS

| | | |
|---|---|---|
| EP | 2 680 408 | 1/2014 |
| JP | S48-60207 | 7/1973 |
| JP | 2010-110025 | 5/2010 |
| JP | 2010-268537 | 11/2010 |
| JP | 2014-166067 | 9/2014 |
| WO | WO 2016/177933 | 11/2016 |
| WO | WO-2016177933 A1 * | 11/2016 |

OTHER PUBLICATIONS

French Search Report and Written Report for FR 1 908 281, mailed Apr. 27, 2020.

* cited by examiner

[Fig. 1]
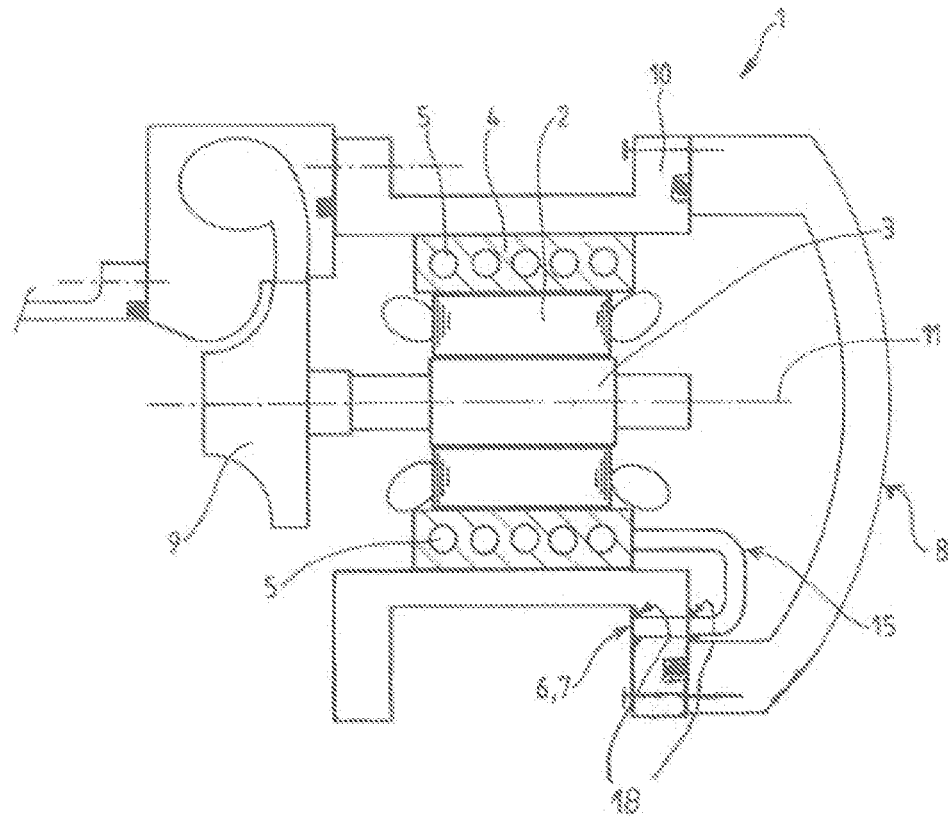
[Fig. 2]
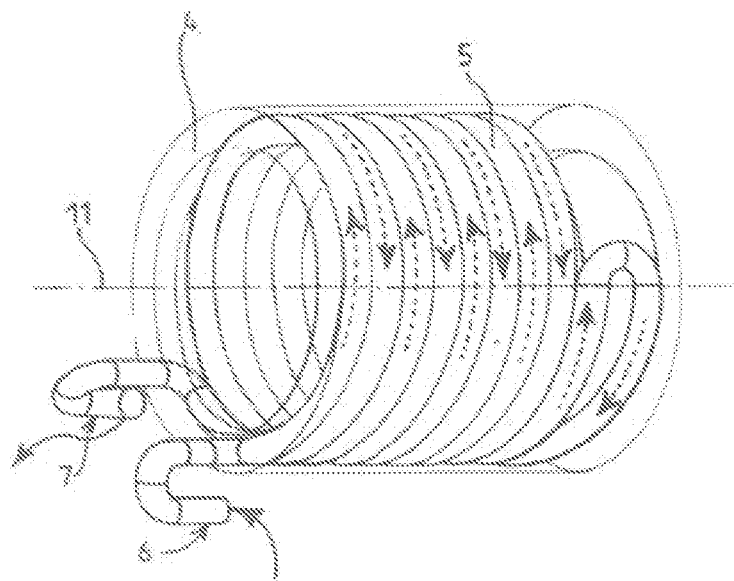

ELECTRIC MACHINE AND MANUFACTURING METHOD

CROSS-REFERENCE TO RELATED APPLICATIONS

This application is a § 371 of International PCT Application PCT/EP2020/067414, filed Jun. 23, 2020, which claims § 119(a) foreign priority to French patent application FR 1908281, filed Jul. 22, 2019.

BACKGROUND

Field of the Invention

The invention relates to an electric machine and the method for manufacturing same.

The invention relates more particularly to an electric machine, in particular an electric motor for driving at least one compressor or circulator, comprising a stator and a rotor that are disposed in a casing, the machine comprising a cooling device that is disposed around the stator and comprises a circuit for circulation of a cooling fluid.

It is known to provide a device for cooling electric motors (and in particular the stator of the motors), cf. for example EP2680408A1.

Related Art

Known cooling devices provide a circuit for circulation of a cooling fluid that is housed in a casing that is sealed or hermetic with respect to the external environment. This circuit is sealed with respect to the rest of the interior volume of the casing of the machine by welds and/or seals.

If the sealing fails, leaks of cooling fluid into the rest of the machine can have serious consequences. In particular, when the machine is a motor for driving a compressor housed in the sealed casing of the machine, the cooling fluid that leaks can mix with the compressed cycle gas. This pollution can damage the installation that uses this cycle gas.

Repairs to the leak points entail disassembly and operations that are long and costly.

SUMMARY OF THE INVENTION

An aim of the present invention is to remedy all or some of the drawbacks of the prior art that are set out above.

To this end, the machine according to the invention, which is otherwise in accordance with the generic definition thereof given in the preamble above, is essentially characterized in that the cooling device comprises a duct for circulation of the cooling fluid that comprises a portion embedded in a mass of material with high thermal conductivity, such as metal or a metal alloy.

Furthermore, embodiments of the invention may have one or more of the following features:
- the mass of material with high thermal conductivity is overmolded around the fluid circulation duct,
- the mass of material with high thermal conductivity is composed of aluminum or an aluminum alloy,
- the duct for circulation of the cooling fluid is constituted of a metal material or a metal alloy, in particular a stainless steel alloy,
- the mass of material with high thermal conductivity has a cylindrical shape, the stator being housed in and in contact with the cylindrical internal surface of said mass,
- the stator is housed in the mass of material with high thermal conductivity by way of an interference fit,
- the casing delimits a preferably hermetic volume, which is for example pressurized, accommodating the stator, the rotor and the cooling device,
- the circulation duct is connected to an inlet and outlet that open onto a wall of the casing,
- the casing comprises an access cover providing access, in the open position, to the stator, to the rotor and to the cooling device in a longitudinal direction parallel to the axis of rotation of the rotor and to the mounting direction of the assembly of stator, rotor and cooling device in the casing,
- the circulation duct comprises preferably bent ends that are connected respectively to the inlet and to the outlet, in the open position the cover also providing access to the ends of the circulation duct that are connected to the inlet and to the outlet so as to allow the removal of the ends connected to the casing and the withdrawal or introduction, into the casing, of the assembly of stator, rotor and cooling device and of said ends of the circulation duct,
- the casing is hermetically closed,
- the portion of the circulation duct that is embedded in the mass of material with thermal high conductivity forms at least one of: zigzags, helices, back-and-forth sections, rectilinear segments, bent segments.

The invention also relates to a method for manufacturing an electric machine, in particular a motor, in accordance with any one of the features above or below, the machine comprising a stator and a rotor that are disposed in a casing and a cooling device that comprises a duct for circulation of the cooling fluid that comprises a portion embedded in a mass of material with high thermal conductivity such as metal or a metal alloy, in which method the cooling device is preassembled with the stator before its introduction into the housing.

The invention can also relate to any alternative device or method comprising any combination of the features above or below within the scope of the claims.

BRIEF DESCRIPTION OF THE FIGURES

Further particular features and advantages will become apparent upon reading the following description, which is provided with reference to the figures, in which:

FIG. 1 shows a schematic and partial view in cross section illustrating an exemplary embodiment of the invention, FIG. 2 shows a schematic and partial perspective view illustrating an exemplary arrangement of the circulation duct.

DETAILED DESCRIPTION OF THE INVENTION

The electric machine 1 (which is in particular an electric motor) illustrated in FIG. 1 comprises a stator 2 and a rotor 3, which are disposed in a casing 10.

Preferably, the casing 10 delimits a hermetic and sealed volume accommodating the stator 2, the rotor 3 and the cooling device.

The stator 2 is disposed around the rotor 3, about a longitudinal axis 11.

The rotor 3 drives, for example, a rotation shaft on which a compressor 9 or circulator is mounted. This means that the machine 1 may be a motor-compressor in particular. Of course, the machine may also be a motor-turbocharger having a turbine mounted on the other end of the shaft and/or a motor driving a plurality of compressors, for example a two-stage motor-compressor (having a compressor wheel on each side of the rotary shaft).

At least a part of the casing 10 can have a shape that is axisymmetric (symmetric about the axis 11) and for example cylindrical or tubular and disposed around the stator 2 (about the longitudinal axis 11). The casing 10 may be composed of metal part(s) that are assembled in a sealed manner by means of seals and fastening pins in particular.

The machine 1 comprises a cooling device disposed around the stator 2. This device conventionally comprises a cooling-fluid circuit, in particular for a heat transfer liquid. Such a heat transfer fluid is generally a liquid that is intended to exchange heat directly or indirectly with a part of the machine and in particular the stator 2. To that end, the cooling fluid may be water or any other liquid or gas or two-phase mixture capable of transporting heat.

According to an advantageous feature, this cooling device comprises a duct 5 for circulation of the cooling fluid that comprises a portion embedded in a mass 4 of material with high thermal conductivity such as metal or a metal alloy.

This portion of the circulation duct 5 that is embedded in the mass 4 of material with high thermal conductivity may in particular be helical and/or describe zigzags. This means that the duct forms multiple passages (in a loop, zigzag or other shape) around and/or along the stator 2.

For example, the duct 5 is bent (preferably without a weld).

As illustrated in [FIG. 2], this duct 5 implements for example a helical back-and-forth section in the direction of the longitudinal axis 11. This makes it possible to obtain a uniform temperature of the stator 2. In this case, the fluid inlet 6 and outlet 7 may be situated on one and the same longitudinal side of the stator 2. For example, the duct 5 is formed of two groups of helices that progress respectively in the longitudinal direction 11 in two opposite directions (respectively back and forth). These two groups of helices may be nested or alternated. This means that, between two helices or turns that cause the fluid to travel in a first longitudinal direction, there is situated a helix or turn that causes the fluid to circulate in the opposite longitudinal direction.

Of course, this embodiment is in no way limiting. For example, alternatively or in combination, the duct 5 may be bent longitudinally. This means that the duct 5 can have portions (which are in particular rectilinear) of opposite directions that extend in a direction parallel to the longitudinal axis 11. This means that the duct 5 forms rectilinear back-and-forth sections in directions that are parallel to the longitudinal direction 11. These longitudinal portions may correspond to generatrices of a cylinder of which the central axis is the longitudinal axis 11. The duct is then bent at the junction between two adjacent longitudinal portions. Other orientations may be provided.

Likewise, any other geometry of the duct 5 may be envisioned, around all or only around a part of the stator.

In addition, so as to have the inlet 6 and outlet 7 on one and the same side of the machine, a return portion of the duct 5 may be realized directly through the mass 4 of material with high thermal conductivity via a tube, in particular a rectilinear tube.

Thus, the assembly comprising the mass 4 of material with high thermal conductivity and the duct 5 can form a tubular block that extends in a longitudinal direction and of which the two ends 6, 7 are situated at one and the same longitudinal end of the mass 4.

This forms an assembly 4, 5 that can be threaded into a casing 10 (for example with the stator 2 and rotor 3 already mounted in the central part of this assembly 4, 5).

This makes the connections with the pipework connected to the machine 1 easier.

High thermal conductivity denotes a thermal conductivity comparable to that of metal or a metal alloy.

For example, the mass 4 of material with high thermal conductivity is composed of aluminum or an aluminum alloy.

This mass 4 of material with high thermal conductivity can be overmolded around the fluid circulation duct 5.

The duct 5 for circulation of the cooling fluid may be constituted of a metal material or a metal alloy, in particular a stainless steel alloy.

As is illustrated, the mass 4 of material with high thermal conductivity has for example a tubular and/or cylindrical shape, and the stator 2, which is for example cylindrical, is housed in and in contact with the internal surface of said mass 4. This means that the mass 4 can have a cylindrical shape that is passed through by the tube formed by the circulation duct 5, meaning that the volume of the mass of metal does not fill the entire cylinder.

For example, the exterior surface of the stator 2 is cylindrical and is threaded into a cylindrical tube formed by the mass 4 of material with high thermal conductivity in a longitudinal direction that is parallel to the axis of rotation of the rotor 3.

For example, the stator 2 may be mounted in the mass 4 of material with high thermal conductivity by way of an interference fit. This provides good thermal conduction between these two elements with a view to effective cooling of the stator 2. If necessary, an intermediate element can be interposed with a view to reducing the contact resistance (thermal grease or adhesive, for example).

This mass 4 of material with high thermal conductivity may have a volume equal to or greater than (for example 1.5 to 3 times greater than) the volume of the portion of duct that it accommodates. This mass 4 can thus have a thermal inertia that promotes effective cooling.

The cooling device and the stator 2 can be preassembled and then the rotor can be mounted in the stator and the assembly can be mounted in the casing 10 of the machine 1.

For example, the casing 10 comprises an access cover 8 providing access, in the open position, to the stator 2, to the rotor 3 and to the cooling device. Preferably, this access is oriented in a longitudinal direction 11 parallel to the axis of rotation of the rotor 3 and to the direction of mounting of the assembly of stator 2, rotor 3 and of the cooling device in the casing 10.

As illustrated, the circulation duct 5 is connected to an inlet 6 and outlet 7 that open onto a wall of the casing 10. Preferably, the inlets 6 and outlet 7 open onto a wall of the casing 10 that is adjacent to the cover (meaning that the inlets 6 and outlets 7 do not open into the cover, making assembly and disassembly easier).

This means that ends of the circulation duct 5 that are for supplying the cooling fluid (before circulation in the mass 4) and returning the cooling fluid (after circulation in the mass 4) can be connected to inlets and outlets at the casing 10 (for example by welding).

As illustrated, the circulation duct 5 may comprise bent ends 15 that are connected respectively to the cooling fluid inlet 6 and outlet 7.

As mentioned above, said inlet 6 and outlet 7 may be situated on one and the same longitudinal side of the stator or opposite one another.

In addition, preferably, when the cover 8 is in the open position, it also provides access to these bent ends 15 of the circulation duct 5 that are connected to the inlet 6 and to the outlet 7. This arrangement allows the bent ends 15 connected to the casing 10 to be removed and the assembly to be withdrawn from the casing 10. Conversely, this arrangement allows, during assembly, the introduction into the casing of the assembly of stator 2 and rotor 3 with the cooling device and the bent ends 15 of the circulation duct 5.

The above arrangement limits the risks of the cooling fluid leaking toward the interior of the casing 10 of the machine 1.

In particular, the proposed structure removes or limits the number of welds that present a risk. For example, if appropriate it is possible to provide only one or a few welds between the ends of the circulation duct 5 and the casing 10, at a location that is easily accessible for maintenance.

As indicated above, the casing 10 is preferably hermetically closed and the various fluid circuits that are connected to the exterior of the casing therefore pass through this casing in a sealed manner so as to ensure the sealing of the various circuits. Thus, the inlet 6 and outlet 7 of the duct pass through the casing 10 in a sealed manner.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising," "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An electric motor for driving at least one compressor or circulator, comprising: a stator and a rotor that are disposed in a casing; and a cooling device that is disposed around the stator, the cooling device comprising a circuit for circulation of a cooling fluid, wherein:
    the cooling device comprises a duct for circulation of the cooling fluid that comprises a portion embedded in a mass of material with high thermal conductivity comparable to that of metal or a metal alloy;
    the mass of material with high thermal conductivity is overmolded around the fluid circulation duct;
    the casing delimits a volume accommodating the stator, the rotor and the cooling device;
    the circulation duct is connected to an inlet and outlet that open onto a wall of the casing;
    the inlet and outlet of the circulation duct open at one and the same longitudinal end of the mass of material with high thermal conductivity;
    a longitudinal direction of the mass of material with high conductivity being parallel to an axis of rotation of the rotor in an assembled position;
    the casing comprises an access cover that provides access, in an open position thereof, to the stator, the rotor, and the cooling device in a longitudinal direction parallel to the axis of rotation of the rotor and to a mounting direction of an assembly made up of the stator, rotor and cooling device in the casing; and
    the inlet and outlet of the duct open onto a wall of the casing that is separate from the access cover.

2. The machine of claim 1, wherein the mass of material with high thermal conductivity is composed of aluminum or an aluminum alloy.

3. The machine of claim 1, wherein the duct for circulation of the cooling fluid is constituted of a metal material or a metal alloy.

4. The machine of claim 1, wherein the duct for circulation of the cooling fluid is constituted of a stainless steel alloy.

5. The machine of claim 1, wherein the mass of material with high thermal conductivity has a cylindrical shape, wherein the stator, which is housed in the mass of material, is in contact with a cylindrical internal surface of said mass of material.

6. The machine of claim 1, wherein the stator is housed in the mass of material with high thermal conductivity by way of an interference fit.

7. The machine of claim 1, wherein:
    the circulation duct comprises bent ends that are connected respectively to the inlet and to the outlet; and
    in the open position the cover also provides access to the ends of the circulation duct that are connected to the inlet and to the outlet so as to allow the removal of the ends connected to the casing and the withdrawal or introduction, into the casing, of the assembly of stator, rotor and cooling device and of said ends of the circulation duct.

8. The machine of claim 1, wherein the casing is hermetically closed.

9. The machine of claim 1, wherein the portion of the circulation duct that is embedded in the mass of material with high thermal conductivity forms at least one of: zigzags, helices, back-and-forth sections, rectilinear segments, and bent segments.

10. A method for manufacturing the motor of claim 1, comprising the steps of:

preassembling the cooling device with the stator before its introduction into the casing;
mounting the rotor into the stator to provide an assembled cooling device, stator, and rotor; and
mounting the assembled cooling device, stator, and rotor into the casing.

11. The machine of claim 1, wherein the mass of material is separate from the casing.

12. The machine of claim 1, wherein an outer surface of the mass of material is in contact with an inner-sidewall of the casing.

13. The machine of claim 1, wherein the duct for circulation of the cooling fluid comprises a stainless steel alloy.

* * * * *